United States Patent
Jung

(10) Patent No.: US 10,745,044 B2
(45) Date of Patent: Aug. 18, 2020

(54) REAR WHEEL STEERING CONTROL SYSTEM AND CONTROL METHOD OF USING THE SAME

(71) Applicants: Hyundai Motor Company, Seoul (KR); Kia Motors Corporation, Seoul (KR)

(72) Inventor: Jang Hyun Jung, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 211 days.

(21) Appl. No.: 15/964,590

(22) Filed: Apr. 27, 2018

(65) Prior Publication Data

US 2019/0161113 A1   May 30, 2019

(30) Foreign Application Priority Data

Nov. 29, 2017   (KR) .................. 10-2017-0161196

(51) Int. Cl.
  *B62D 5/04* (2006.01)
  *H02P 7/29* (2016.01)
  *B62D 7/15* (2006.01)

(52) U.S. Cl.
  CPC .......... *B62D 5/0484* (2013.01); *B62D 5/046* (2013.01); *B62D 5/0481* (2013.01); *B62D 7/1581* (2013.01); *H02P 7/29* (2013.01)

(58) Field of Classification Search
  CPC .. B62D 5/0484; B62D 7/1581; B62D 5/0481; B62D 5/046; H02P 7/29
  USPC ......................................................... 701/41
  See application file for complete search history.

(56) References Cited

U.S. PATENT DOCUMENTS

| | | | |
|---|---|---|---|
| 9,321,480 | B2 | 4/2016 | Suzuki et al. |
| 2009/0140673 | A1* | 6/2009 | Kasai ................... B62D 5/046 318/139 |
| 2011/0035108 | A1* | 2/2011 | Yamashita ........... B62D 5/0463 701/41 |
| 2019/0056771 | A1* | 2/2019 | Sato ....................... H03K 3/017 |

FOREIGN PATENT DOCUMENTS

| | | |
|---|---|---|
| JP | H 107011 A | 1/1998 |
| JP | 2011-178236 A | 9/2011 |
| JP | 2017-005944 A | 1/2017 |
| JP | 2017-139955 A | 8/2017 |
| KR | 10-2016-0044648 | 4/2016 |

* cited by examiner

*Primary Examiner* — Nadeem Odeh
(74) *Attorney, Agent, or Firm* — Mintz Levin Cohn Ferris Glovsky and Popeo, P.C.; Peter F. Corless

(57) ABSTRACT

A rear wheel steering control system for a rear wheel steering (RWS) system of a vehicle can include: a voltage detecting unit detecting a magnitude of a battery voltage of a battery of the vehicle; a supplemental voltage circuit unit generating a supplemental voltage that supplements the battery voltage; and a control unit comparing the magnitude of the battery voltage with a magnitude of a required voltage required for normally operating a rear wheel steering actuator of the RWS system, calculating a magnitude of the supplemental voltage based on the comparing of the magnitude of the battery voltage with the magnitude of the required voltage, and controlling the supplemental voltage circuit unit so as to generate the supplemental voltage according to the calculated magnitude.

9 Claims, 5 Drawing Sheets

REAR WHEEL STEERING CONTROL SYSTEM AND CONTROL METHOD OF USING THE SAME

CROSS-REFERENCE TO RELATED APPLICATION

The present application claims the benefit of priority to Korean Patent Application No. 10-2017-0161196 filed on Nov. 29, 2017, the entire contents of which are incorporated herein for all purposes by reference.

BACKGROUND OF THE DISCLOSURE

Field of the Disclosure

The present disclosure relates generally to vehicular technologies and, more particularly, to a rear wheel steering control system and a control method of using the same.

Description of the Related Art

Recently, Rear Wheel Steering (RWS) systems which steer a vehicle's rear wheels have been implemented in order to improve driving performance and stability. The RWS system differentiates steering angles of the front wheel and the rear wheel in accordance with a driving speed of the vehicle. For example, if the vehicle is driving at low speed, the RWS system steers the rear wheel in a direction opposite to that of the front wheel. If the vehicle is driving at medium or high speed, the RWS system steers the rear wheel in the same direction as that of the front wheel.

In order to enable a smooth turn, even when the vehicle is driving at low speed on a narrow road, the front and rear wheels are steered in an opposite direction to reduce a turning radius. In order to improve straight-line driving when the vehicle is driving at high speed, the front and rear wheels are steered in the same direction to improve stability.

Conventionally, a RWS actuator of the RWS system controlling the steering of the rear wheel is operated by a battery embedded in the vehicle, and, problematically, a voltage drop of the battery can occur due to low temperatures (e.g., during winter). Due to the voltage drop of the battery, even if the RWS actuator is operated, the revolutions per minute (RPM) is reduced to delay the time needed to steer the rear wheel at a target angle.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure is proposed for solving the above-described problem, and is intended to provide a rear wheel steering control system and a control method of using the same capable of comparing a detected magnitude of a battery voltage with a magnitude of a required voltage required for normally operating a rear wheel steering actuator. A supplemental voltage can then be generated through a supplemental voltage circuit unit if the supplemental voltage is needed based on the comparison, thus stably supplying a voltage even if a voltage drop of the battery occurs (e.g., due to low temperatures during the winter, and the like), allowing for normal operation of the rear wheel steering.

In accordance with embodiments of the present disclosure, a rear wheel steering control system for a rear wheel steering (RWS) system of a vehicle includes: a voltage detecting unit detecting a magnitude of a battery voltage of a battery of the vehicle; a supplemental voltage circuit unit generating a supplemental voltage that supplements the battery voltage; and a control unit comparing the magnitude of the battery voltage with a magnitude of a required voltage required for normally operating a rear wheel steering actuator of the RWS system, calculating a magnitude of the supplemental voltage based on the comparing of the magnitude of the battery voltage with the magnitude of the required voltage, and controlling the supplemental voltage circuit unit so as to generate the supplemental voltage according to the calculated magnitude.

The supplemental voltage circuit unit can include a Pulse Width Modulation (PWM) signal generating unit calculating a duty ratio based on the comparing of the magnitude of the battery voltage with the magnitude of the required voltage, and generating a PWM signal; a switch which is turned on or off in accordance with the PWM signal; a coil storing energy supplied from the battery when the switch is turned on; and a capacitor receiving and charging the energy supplied from the battery and energy stored in the coil when the switch is turned off, wherein a charged voltage of the capacitor is supplied to a motor operating the rear wheel steering actuator.

One end of the coil can be connected to one end of the battery, the other end of the coil can be connected to one end of the switch and one end of the capacitor, the other end of the switch can be connected to the other end of the battery and the other end of the capacitor, and both ends of the capacitor can be connected to both ends of the motor.

The control unit, when the magnitude of the battery voltage is smaller than the magnitude of the required voltage, can control a duty ratio of a signal generated by the PWM signal generating unit to generate the supplemental voltage.

The coil may store energy when the switch is turned on, and a voltage equal to a sum of the battery voltage and the supplemental voltage may be applied to the motor when the switch is turned off.

Furthermore, according to embodiments of the present disclosure, a rear wheel steering control method for a rear wheel steering (RWS) system of a vehicle includes: detecting a magnitude of a battery voltage of a battery of the vehicle; comparing the magnitude of the battery voltage with a magnitude of a required voltage required for normally operating a rear wheel steering actuator of the RWS system; calculating a magnitude of a supplemental voltage that supplements the battery voltage based on the comparing of the magnitude of the battery voltage with the magnitude of the required voltage; and controlling a supplemental voltage circuit unit so as to generate the supplemental voltage according to the calculated magnitude.

The controlling of the supplemental voltage circuit unit may include controlling the supplemental voltage circuit unit so as to adjust a duty ratio of a signal generated in a PWM signal generating unit.

The method may further include controlling a motor which operates the rear wheel steering actuator using energy of the battery when a difference between the magnitude of the battery voltage and the magnitude of the required voltage is smaller than or equal to a predetermined value.

Furthermore, in accordance with embodiments of the present disclosure, a non-transitory computer readable medium containing program instructions for controlling a rear wheel steering (RWS) system of a vehicle, when executed by a processor, causes the processor to: compare a magnitude of the battery voltage detected by voltage detecting unit with a magnitude of a required voltage required for normally operating a rear wheel steering actuator of the RWS system; calculate a magnitude of a supplemental voltage that supplements the battery voltage based on the comparing of the magnitude of the battery voltage with the magnitude of the required voltage; and control a supplemental voltage circuit unit so as to generate the supplemental voltage according to the calculated magnitude.

In accordance with the present disclosure, by comparing the detected magnitude of the battery voltage with the magnitude of the required voltage required for normally operating the rear wheel steering actuator, and generating the supplemental voltage through the supplemental voltage circuit unit if the supplemental voltage is needed in accordance with a result of the comparison, it is possible to stably supply a voltage even if a voltage drop of the battery occurs (e.g., due to a low temperature during winter, and the like), thus enabling normal operation of the rear wheel steering system.

BRIEF DESCRIPTION OF THE DRAWINGS

The above and other objects, features and other advantages of the present disclosure will be more clearly understood from the following detailed description when taken in conjunction with the accompanying drawings, in which.

Figure 1:
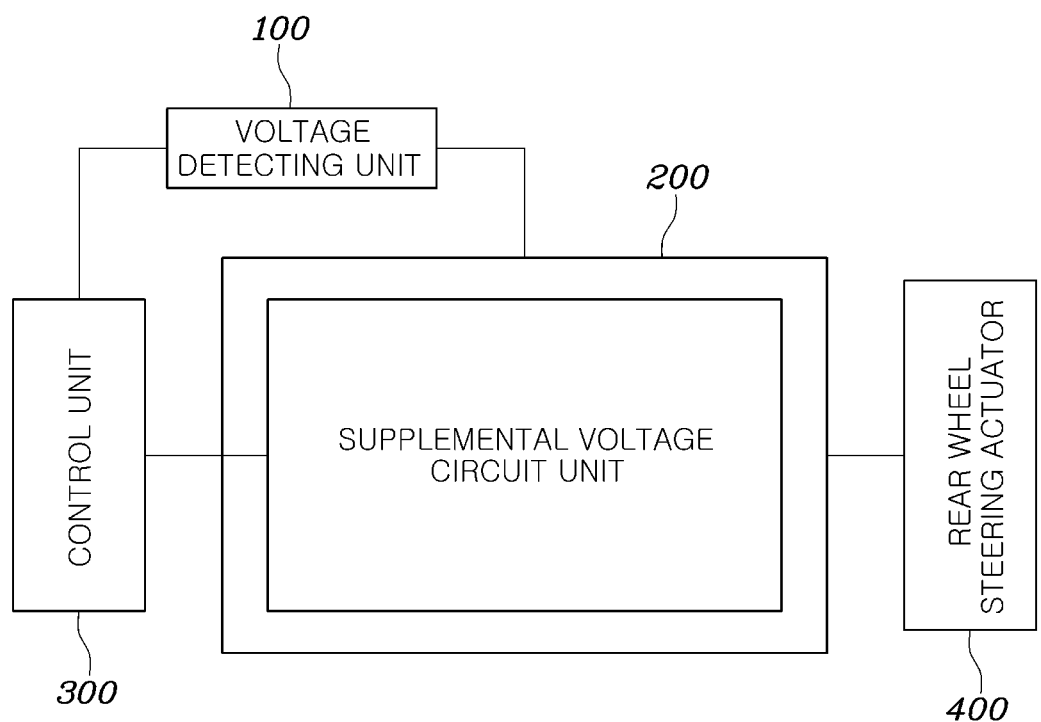
FIG. 1 is a view schematically illustrating overall configurations of a rear wheel steering control system in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term it "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a rear wheel steering control system for a vehicle and a control method thereof in accordance with a preferred embodiment of the present disclosure will be described with reference to the accompanying drawings.

FIG. 1 is a view schematically illustrating overall configurations of a rear wheel steering control system in accordance with embodiments of the present disclosure. As illustrated in FIG. 1, the rear wheel steering control system in accordance with embodiments of the present disclosure can be composed of a voltage detecting unit 100, a supplemental voltage circuit unit 200, and a control unit 300.

The voltage detecting unit 100 functions as detecting a voltage magnitude of a battery 210. Generally, in the rear wheel steering control system, steering of the rear wheel is adjusted by a rear wheel steering actuator 400 in accordance with a vehicle speed. In order for the rear wheel steering actuator 400 to normally operate, a minimum of a required voltage should be satisfied. Herein, the rear wheel steering actuator 400 is operated by a motor, and the motor is operated by the battery. Thus, in order for the rear wheel steering actuator 400 to normally operate by the motor, the required voltage for normally operating the rear wheel steering actuator 400 should be stored in the battery, and in order to confirm whether the voltage having a magnitude of the required voltage was stored in the battery, the magnitude of the battery voltage can be detected through the voltage detecting unit 100.

The supplemental voltage circuit unit 200 can generate a supplemental voltage that supplements the voltage of the battery 210. That is, if the voltage magnitude of the battery 210 detected through the voltage detecting unit 100 is smaller than the magnitude of the required voltage required for normally operating the rear wheel steering actuator 400, the supplemental voltage that supplements an insufficient voltage of the battery 210 can be generated through the supplemental voltage circuit unit 200. Hereinafter, a procedure of generating the supplemental voltage through the supplemental voltage circuit unit 200 will be described in more detail with reference to FIGS. 2 and 3.

Figure 2:
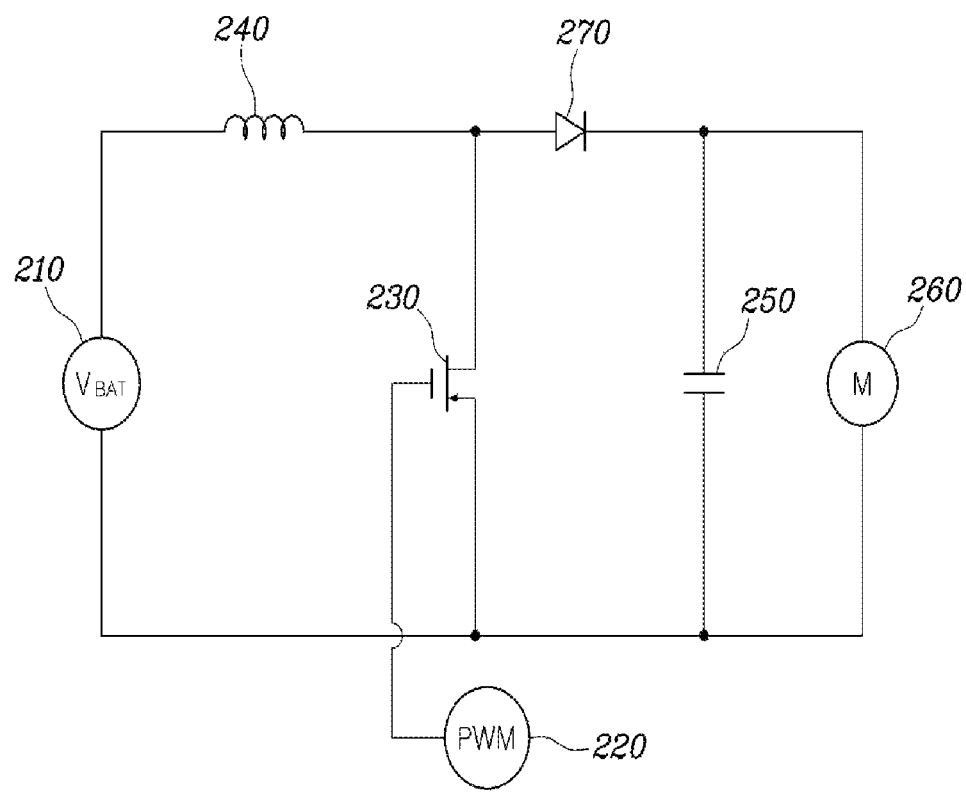
FIG. 2 is a view illustrating a supplemental voltage circuit unit in the rear wheel steering control system in accordance with embodiments of the present disclosure.
Figure 3:
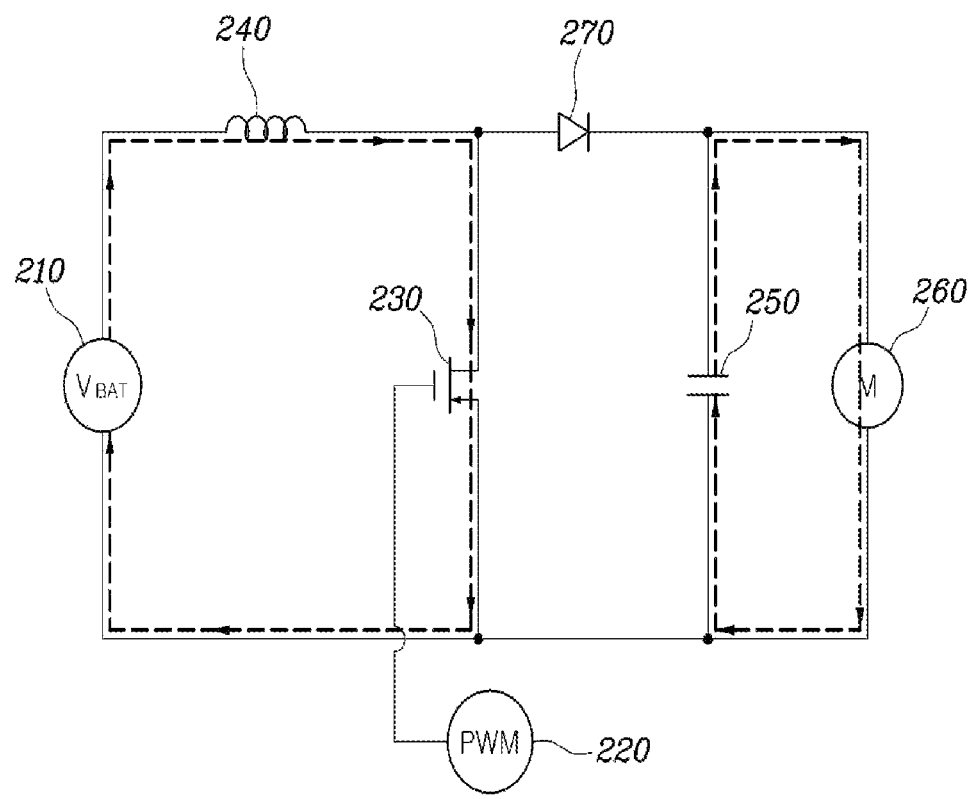
FIG. 3 is a view illustrating current flow of the supplemental voltage circuit unit in a switched-on case in the rear wheel steering control system in accordance with embodiments of the present disclosure.
Figure 4:
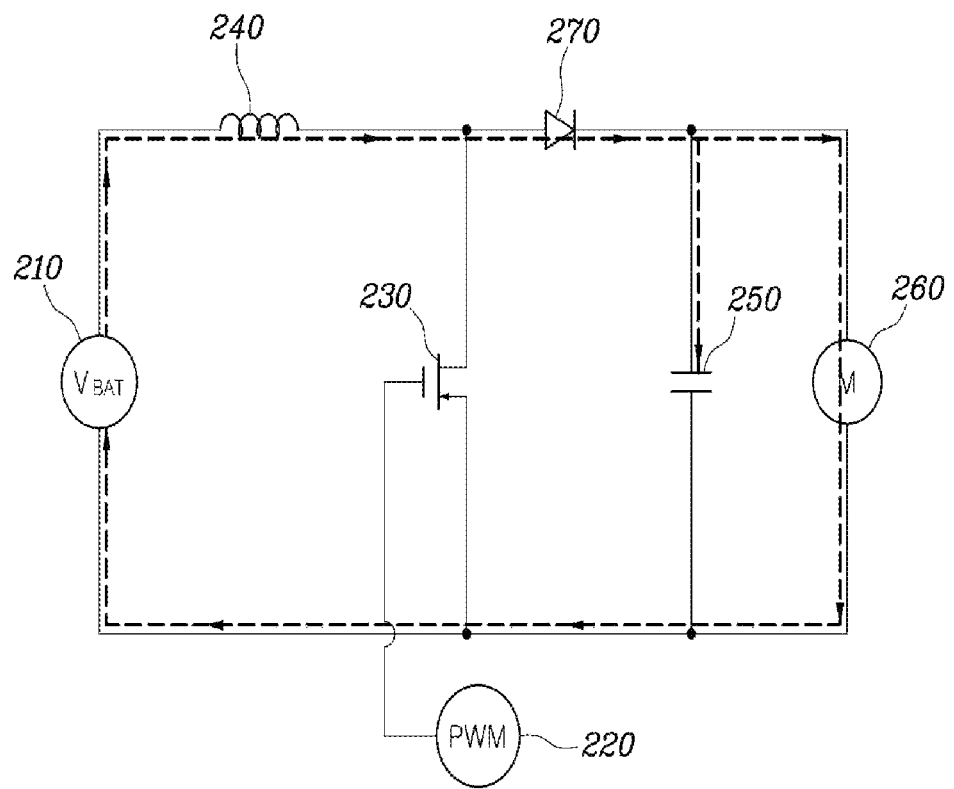
FIG. 4 is a view illustrating current flow of the supplemental voltage circuit unit in a switched-off case in the rear wheel steering control system in accordance with embodiments of the present disclosure.

FIG. 2 is a view illustrating the supplemental voltage circuit unit in the rear wheel steering control system in accordance with embodiments of the present disclosure; FIG. 3 is a view illustrating current flow of the supplemental voltage circuit unit in a switched-on case in the rear wheel steering control system in accordance with embodiments of the present disclosure; and FIG. 4 is a view illustrating current flow of the supplemental voltage circuit unit in a switched-off case in the rear wheel steering control system in accordance with embodiments of the present disclosure.

As illustrated in FIG. 2, the supplemental voltage circuit unit 200 can include, for example, the battery 210, a PWM signal generating unit 220, a switch 230, a coil 240, a capacitor 250, and a motor 260, and can further include a diode 270 in some cases.

The battery 210 supplies an energy to the motor 260 operating the rear wheel steering actuator 400 to adjust the steering of the rear wheel in accordance with a vehicle speed through the rear wheel steering actuator 400.

The PWM signal generating unit 220 generates a PWM signal based on the result that compares the voltage magnitude of the battery 210 detected through the voltage detecting unit 100 with the magnitude of the required voltage for operating the rear wheel steering actuator 400. It will be later described in more detail while describing the control unit 300, but the PWM signal generating unit 220 generates the PWM signal of a duty ratio determined by the control unit 300.

The switch 230 can be connected with the PWM signal generating unit 220, and can be turned on/off in accordance with the PWM signal generated in the PWM signal generating unit 220. More specifically, if the signal generated in the PWM signal generating unit 220 is ON, the switch 230 can be turned on; and if the signal generated in the PWM signal generating unit 220 is OFF, the switch 230 can be turned off.

The coil 240 can store an energy supplied from the battery 210 if the switch 230 is turned on. More specifically, referring to FIG. 3, if the switch 230 is turned on, a magnetic field line can be generated while current flows on the coil 240; and as the magnetic field line is generated, the energy can be stored while a voltage is induced on the coil.

According to embodiments of the present disclosure, if the magnitude of the battery voltage detected through the voltage detecting unit 100 is smaller than the magnitude of the required voltage required for normally operating the rear wheel steering actuator 400, a supplemental voltage is generated through the supplemental voltage circuit unit 200. By storing the energy supplied from the battery 210 in the coil 240 if the switch 230 is turned on, and then if the switch 230 is turned off, as illustrated in FIG. 4, supplying a sum of the energy supplied from the battery and the energy stored in the coil to the motor 260, the voltage having a magnitude of the sum of the battery voltage and the supplemental voltage stored through the coil is applied to the motor 260 to thus normally operate the rear wheel steering actuator 400.

The capacitor 250, if the switch 230 is turned off, as illustrated in FIG. 4, can receive and charge the energy supplied from the battery 210 and the energy stored in the coil 240. In this case, the charged voltage of the capacitor 250, as illustrated in FIG. 3, if the switch 230 is turned on, can be supplied to the motor 260 operating the rear wheel steering actuator 400. In this case, the diode 270 can prevent the current exiting from the capacitor 250 from flowing toward the coil 240.

Meanwhile, referring to FIGS. 2 to 4, one end of the coil 240 can be connected with one end of the battery 210; the other end of the coil 240 can be connected with one end of the switch 230 and one end of the capacitor 250; the other end of the switch 230 can be connected with the other end of the battery 210 and the other end of the capacitor 250; and both ends of the capacitor 250 can be connected with both ends of the motor 260.

The control unit 300 compares a voltage magnitude of the battery 210 detected through the voltage detecting unit 100 with the magnitude of the required voltage required for normally operating the rear wheel steering actuator 400, calculates the magnitude of the supplemental voltage in accordance with the compared result, and controls the supplemental voltage circuit unit 200 so as to generate the determined magnitude of the supplemental voltage. That is, the control unit 300 can determine the magnitude of the supplemental voltage necessary for the case that the magnitude of the voltage detected through the voltage detecting unit 100 is smaller than the magnitude of the required voltage, and generate the supplemental voltage via the supplemental voltage circuit unit 200.

In order to generate the determined magnitude of the necessary supplemental voltage through the supplemental voltage circuit unit 200, the control unit 300 can adjust a duty ratio of a signal generated in the PWM signal generating unit 220 to generate the supplemental voltage. More specifically, as described above, the switch 230 is turned on if a duty in the signal generated in the PWM signal generating unit 220 is ON; if the switch 230 is turned on, the coil 240 can store the energy supplied from the battery 210; and the control unit 300 can adjust a duty ratio thereof in accordance with the determined magnitude of the necessary supplemental voltage to adjust the time of the state that the switch 230 is turned on and the magnitude of the energy stored in the coil 240. That is, a duty width of the case that the magnitude of the necessary supplemental voltage is relatively large becomes larger than that of the case that the magnitude of the necessary supplemental voltage is relatively small. Thus, the state in which the switch 230 is turned on can become longer and the magnitude of the energy stored in the coil 240 can be increased.

Figure 5:
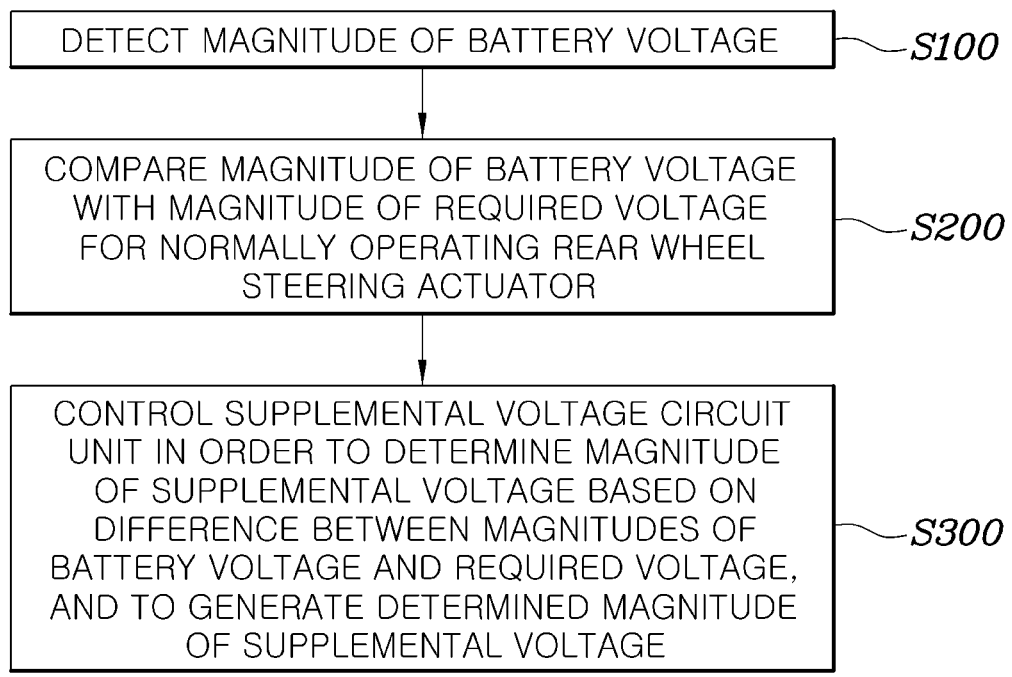
FIG. 5 is a flowchart illustrating flow of a rear wheel steering control method in accordance with embodiments of the present disclosure.

FIG. 5 is a flowchart illustrating flow of a rear wheel steering control method in accordance with embodiments of the present disclosure. As illustrated in FIG. 5, the rear wheel steering control method using the rear wheel steering control system can include detecting the magnitude of the battery voltage; comparing the magnitude of the battery voltage with the magnitude of the required voltage required for normally operating the rear wheel steering actuator; calculating the magnitude of the supplemental voltage based on the difference between the magnitudes of the battery voltage and the required voltage; and controlling the supplemental voltage circuit unit so as to generate the determined magnitude of the supplemental voltage. In this case, the control unit, in controlling the supplemental voltage circuit unit, can adjust a duty ratio of the signal generated in the PWM signal generating unit in order to generate the determined magnitude of the supplemental voltage.

Meanwhile, in comparing the magnitude of the battery voltage and the magnitude of the required voltage, if the difference between the magnitude of the battery voltage and the magnitude of the required voltage is equal to or smaller than a predetermined value, the motor can be operated by the energy of the battery. In this case, the battery voltage is not dropped, and because the rear wheel steering actuator can be normally operated by the energy stored in the battery, the supplemental voltage is not additionally generated through the supplemental voltage circuit unit.

As described above, in accordance with embodiments of the present disclosure, by comparing the detected magnitude of the battery voltage with the magnitude of the required voltage required for normally operating the rear wheel steering actuator, and generating the supplemental voltage through the supplemental voltage circuit unit if the supplemental voltage is needed in accordance with a result of the comparison, it is possible to stably supply a voltage even if a voltage drop of the battery occurs (e.g., due to a low temperature during winter, and the like) to normally operate the rear wheel steering.

Although certain embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A rear wheel steering control system for a rear wheel steering (RWS) system of a vehicle, the rear wheel steering control system comprising:
   a voltage detecting sensor detecting a magnitude of a battery voltage of a battery of the vehicle;
   a supplemental voltage circuit unit generating a supplemental voltage that supplements the battery voltage; and
   a processor comparing the magnitude of the battery voltage with a magnitude of a required voltage required for normally operating a rear wheel steering actuator of the RWS system, calculating a magnitude of the supplemental voltage based on the comparing of the magnitude of the battery voltage with the magnitude of the required voltage, and controlling the supplemental voltage circuit unit so as to generate the supplemental voltage according to the calculated magnitude.

2. The rear wheel steering control system according to claim 1, wherein the supplemental voltage circuit unit comprises:
   a Pulse Width Modulation (PWM) signal generator generating a PWM signal of a duty ratio determined by the processor;
   a switch which is turned on or off in accordance with the PWM signal;
   a coil storing energy supplied from the battery when the switch is turned on; and
   a capacitor receiving and charging the energy supplied from the battery and the energy stored in the coil when the switch is turned off,
   wherein a charged voltage of the capacitor is supplied to a motor operating the rear wheel steering actuator.

3. The rear wheel steering control system according to claim 2, wherein one end of the coil is connected to one end of the battery, the other end of the coil is connected to one end of the switch and one end of the capacitor, the other end of the switch is connected to the other end of the battery and the other end of the capacitor, and both ends of the capacitor are connected to both ends of the motor.

4. The rear wheel steering control system according to claim 2, wherein:
   the coil stores the energy when the switch is turned on; and
   a voltage equal to a sum of the battery voltage and the supplemental voltage is applied to the motor when the switch is turned off.

5. The rear wheel steering control system according to claim 1, wherein the control unit, when the magnitude of the battery voltage is smaller than the magnitude of the required voltage, controls a duty ratio of a signal generated by a Pulse Width Modulation (PWM) signal generator to generate the supplemental voltage.

6. A rear wheel steering control method for a rear wheel steering (RWS) system of a vehicle, the rear wheel steering control method comprising:
   detecting a magnitude of a battery voltage of a battery of the vehicle;
   comparing the magnitude of the battery voltage with a magnitude of a required voltage required for normally operating a rear wheel steering actuator of the RWS system;
   calculating a magnitude of a supplemental voltage that supplements the battery voltage based on the comparing of the magnitude of the battery voltage with the magnitude of the required voltage; and
   controlling a supplemental voltage circuit unit so as to generate the supplemental voltage according to the calculated magnitude.

7. The rear wheel steering control method according to claim 6, wherein the controlling of the supplemental voltage circuit unit comprises:
   controlling the supplemental voltage circuit unit so as to adjust a duty ratio of a signal generated in a Pulse Width Modulation (PWM) signal generator.

8. The rear wheel steering control method according to claim 6, further comprising:
   controlling a motor which operates the rear wheel steering actuator using energy of the battery when a difference between the magnitude of the battery voltage and the magnitude of the required voltage is smaller than or equal to a predetermined value.

9. A non-transitory computer readable medium containing program instructions for controlling a rear wheel steering (RWS) system of a vehicle, the program instructions when executed by a processor causing the processor to:
   compare a magnitude of a battery voltage detected by a voltage detecting sensor with a magnitude of a required voltage required for normally operating a rear wheel steering actuator of the RWS system;
   calculate a magnitude of a supplemental voltage that supplements the battery voltage based on the comparing of the magnitude of the battery voltage with the magnitude of the required voltage; and control a supplemental voltage circuit unit so as to generate the supplemental voltage according to the calculated magnitude.

\* \* \* \* \*